United States Patent [19]

Cheshire et al.

[11] Patent Number: 5,001,023
[45] Date of Patent: Mar. 19, 1991

[54] SOLID ELECTROLYTE DEVICES

[75] Inventors: Phillip Cheshire, Lancashire; Jozef Przeworski, Chester, both of United Kingdom

[73] Assignee: Imperial Chemical Industries PLC, London, England

[21] Appl. No.: 317,557

[22] Filed: Mar. 1, 1989

[30] Foreign Application Priority Data

Mar. 1, 1988 [GB] United Kingdom ............... 8804860

[51] Int. Cl.$^5$ .............................................. H01M 6/18
[52] U.S. Cl. ...................................... 429/94; 429/192; 29/623.5
[58] Field of Search ................... 429/94, 192; 29/623.5

[56] References Cited

U.S. PATENT DOCUMENTS 4,303,748 12/1981 Armand et al. ...................... 429/192
4,822,701 4/1989 Ballard et al. ...................... 429/192
4,830,939 5/1989 Lee et al. ........................... 429/192

FOREIGN PATENT DOCUMENTS

145498 6/1985 European Pat. Off. ............ 429/192

Primary Examiner—Stephen J. Kalafut
Attorney, Agent, or Firm—Cushman, Darby & Cushman

[57] ABSTRACT

An electrochemical or an electroyltic device comprises a conductive anode and cathode separated by a solid electrolyte, and wherein one electrode surrounds the other, and the solid electrolyte comprises:
 (a) a matrix of polymer main chains, having side-chains linked to the main chains, which side chains comprise polar groups free from active hydrogen atoms,
 (b) a polar aprotic liquid dispersed in the matrix, and
 (c) an ionised ammonium, alkali metal or alkaline earth metal salt dissolved in the matrix and/or liquid, and a process for the preparation thereof.

8 Claims, 2 Drawing Sheets

SOLID ELECTROLYTE DEVICES

This invention relates to electrochemical and electrolytic devices, such as batteries (electrochemical cells) and electrolytic capacitors, which comprise a solid electrolyte.

We have found that a specific type of solid electrolyte which contains liquid, is nevertheless advantageously dry handling, is dimensionally stable, cohesive and flexible, and has good elastically resilient tensile and compression properties and unexpectedly good conductivity. The electrolyte is thus suitable for and enables the production of high energy density devices, eg batteries having an unexpectedly high power density (ie power per unit weight) at room temperature. This type of solid electrolyte is further described hereinafter and is known herein as 'the Solid Electrolyte'.

Accordingly the present invention provides an electrochemical or electrolytic device which comprises a conductive anode and cathode separated by the Solid Electrolyte, and wherein one electrode surrounds the other.

Where the device is an electrochemical device such as an electrochemical cell (or battery), the electrodes will of course be capable of mutual electrochemical reaction.

In a preferred embodiment the device will be flexible, and will generally be elongate. For example, one of the electrodes and especially the Solid Electrolyte may be thin coaxial cylindrical films, so that the device is highly compact and is in the form of a flexible multi-sheathed cable, and is thus conformable to any desired shape.

The present invention also provides a process for the preparation of the devices.

The Solid Electrolyte comprises:

(a) a matrix of polymer main chains, having side-chains linked to the main chains, which side chains comprise polar groups free from active hydrogen atoms, (b) a polar aprotic liquid dispersed in the matrix, and (c) an ionised ammonium, alkali metal or alkaline earth metal salt dissolved in the matrix and/or liquid.

It is preferred that the polymer main chains are cross-linked.

In the matrix of the Solid Electrolyte in the devices of the present invention, the (preferably cross-linked) polymer main chains (to which the side chains are linked) may be for example: essentially organic such as organic polymer chains optionally comprising sulphur, nitrogen, phosphorus or oxygen atoms; or inorganic-organic such as polymer chains comprising silicon and oxygen atoms, for example comprising polymeric polysiloxane chains.

Essentially organic cross-linked polymer main chains are favourably hydrocarbons, or polyethers with cross-linking functions eg oxy or cross-linked —C=C— groups. Preferably such cross-linked chains contain no, or at most a few, free cross-linking, e.g., —C=C— functions.

The cross-linking eg —C=C— functions are favourably pendent, and may be in the side chains, e.g. in a terminal position.

However, also within the scope of the present invention are polymer chains without specific cross-linking functions which are cross-linked by C—C bonds between chain atoms in the main chain (and/or in side chains as defined).

The polymer chains are preferably cross-linked for good mechanical properties, eg tear resistance and elastic resilience and to ensure that at a chosen loading of polar liquid the Solid Electrolyte remains solid at ambient temperatures. However, excessive cross-linking tends to affect other desirable physical properties of the Solid Electrolyte adversely, for example extensibility, feasible liquid loading levels and the conductivity of the Solid Electrolyte and its adhesion to an electrode (which may facilitate the production of the device). In some instances the last desideratum may become the dominant factor in the design of the polymer for use in the matrix of the Solid Electrolyte in the devices of the present invention, so that the polymer main chains may even be un-crosslinked. However, a degree of cross-linking is generally preferred. The optimum degree of such cross-linking will be dictated by a balance of all such properties and will vary widely with the specific matrix material (inter alia). Within the composition ranges of the Solid Electrolyte given hereinafter such optimization is largely a matter of routine trial. However, by way of example it is often suitable if 2 to 8% of the monomer units of the sheet chain backbones are cross-linked, often via functions pendent from such units. In the embodiments of the Solid Electrolyte further described hereinafter, main chains typically average 2,500 to 10,000 backbone units per chain with 50 to 800 cross-links per chain. Corresponding Solid Electrolytes form a preferred aspect of the present invention.

Each main chain is favourably linked to an average of at least 2, and preferably at least 4, side-chains (for example within preferred main chains to 10 to 10,000 side-chains).

The polar groups in such side-chains may for example be ester or ether linkages.

Where the matrix (favourably) consists essentially of (preferably cross-linked) hydrocarbon or polyether chains, the side-chains are favourably end-capped polyether or polyether ester, such as polyalkylene oxide, or polyalkylene oxide carbonate side-chains linked to the main chains by oxy, or for hydrocarbon and polyether chains, oxycarbonyl or carbonate groups.

By 'end-capped' herein is meant that terminal OH groups in such chains are replaced by groups without active hydrogen atoms, eg ether or ester groups.

In such favoured main and side-chains, the equivalent ratio of side-chain polar groups (excluding any linking groups) to total carbon atoms in the matrix may suitably be in the range 2:3 to 1:6, preferably 2:3 to 1:4, such as 1:2 to 1:3.

Favoured polyether chains with side-chains of the above favoured polyether types may be made for example by copolymerizing monomers comprising ethylene and/or propylene oxide with for example a compound selected from butadiene monoxide, glycidyl methacrylate, glycidyl acrylate and vinyl glycidyl ether and in addition with glycidol.

The free —OH groups resulting from the glycidol and the terminal —OH groups of the polyether chains may be reacted with alkylene oxides, preferably ethylene oxide and optionally derivatives thereof, using for example a basic or acidic catalyst to form side-chains comprising polar groups as aforesaid. The free OH groups may be reacted to eliminate the active hydrogen atoms ('capped'), (for example by forming alkoxy groups) by reacting them with an alkyl halide for example methyl chloride in the presence of a basic catalyst or by forming ester groups with a carboxylic acid or anhydride).

Where any of the foregoing cross-linkable polymers contain —C═C— groups (in the main or side chains), they may be cross-linked using for example free radical or γ-radiation, generally after side chain formation and capping (if effected).

Cross-linking may also be achieved even if no unsaturated groups are present, for example, with free radical forming substances for example peroxides, such as benzoyl peroxide, optionally with heating. However, this procedure may cause adhesion of the matrix to a vessel in which it is made, and the degree of cross-linking may be so low that (although corresponding Solid Electrolytes tend to have good ambient temperature conductivities) the mechanical properties (eg tear resistance) of such matrices are less than optimum, and it is thus generally preferred that cross-linking should take place eg between favoured hydrocarbon or polyether chains by reaction of cross-linking functions, e.g., —C═C— groups such that such cross-linked chains contain few free cross-linkable groups. However, as described hereinafter it may be desirable to produce a thin film of Solid Electrolyte or a thin film cathode comprising Solid Electrolyte adhering to a support. In such a case physical properties of the Solid Electrolyte such as tear-resistance are often of less importance than good adhesion to the substrate, and the foregoing lightly cross-linked matrices may be preferred in such an application for the latter property.

Favoured hydrocarbon main chains may be preformed by polymerization of moieties containing —C═C— groups. Such polymers are then subsequently or synchronously cross-linked, optionally via cross-linkable functions (eg further —C═C— functions) favourably pendent from the main chain, such as in a side chain as hereinbefore defined eg in a terminal position.

Thus, for example main chains may be formed by polymerization of a first monomer species comprising a single —C═C— function and a side chain moiety as defined hereinbefore, optionally together with a second monomer comprising two —C═C— functions to provide at least one cross-linkable —C═C— function for the final sheet chain, which is often pendent and often in a side-chain as defined. The side-chain moiety may be a favoured end capped polyether or polyether ester chain. Thus for example the first monomer species may be a methoxy polyethylene oxide methacrylate or acrylate, optionally copolymerized with allyl methacrylate or acrylate as comonomer, or a polyethylene oxide dimethacrylate or diacrylate, or a polyethylene oxide carbonate dimethacrylate or diacrylate, subsequently homopolymerized.

End-capping of side-chains (to eliminate active hydrogen atoms) and cross-linking of the main chains may be effected as described above, in the case of cross-linking, whether cross-linking —C═C— groups are present or absent.

The relevant polymerization of monomer —C═C— groups may be effected using free radical or group transfer initiation or γ-radiation. Such conditions may intrinsically, or may be adjusted to, also effect synchronous or immediately subsequent cross-linking, so that cross-linked matrix formation from monomer may be run as a one-pot process, in particular where a difunctional comonomer is used.

Organic-inorganic polysiloxane chains, (together with the side-chains linked thereto) are preferably of the formula:

wherein
each group R independently is alkyl or cross-linked alkenyl, (preferably $C_{1-6}$ alkyl or cross-linked $C_{1-6}$ alkenyl, in particular methyl), or cross-linking oxy, and each group A is a group as defined for R (with the same preferred groups as for R) or a side-chain (as hereinbefore defined) comprising an end-capped polyether or polyether ester, eg a capped polyalkylene oxide or polyalkylene oxide carbonate group, at least 20% and preferably at least 40% of the groups A being such side chains.

Such polysiloxane chains are cross-linked through the groups R when oxy or through —C═C— functions in R and/or A (as defined). Corresponding matrices preferably contain no, or at most few, free —C═C— functions.

The optimum percentage of groups A which are side-chains as hereinbefore defined will vary widely within the above mentioned ranges with the specific matrix material (inter alia) and is a matter of routine trial to determine. Suitable and typical degrees of cross-linking and main chain lengths for such polysiloxanes are as so described for essentially organic polymers hereinbefore.

A corresponding matrix may suitably be made by preforming individual chains, complete with all R and A groups as defined, or cross-linkable precursors thereof and subsequently end-capping side-chains if desired as described hereinabefore, and then cross-linking by heating. For R oxy cross-linking functions, corresponding chains, but wherein R is H, are preformed and sufficient water is allowed to be present to provide the desired number of oxy functions. It is preferred that cross-linking should be carried out in an inert atmosphere, for example of nitrogen. Oxygen may be present if desired but tends to accelerate cross-linking and thus produces a "skin" on any surface of the material which is in contact with it.

Where no unsaturation is present free radical transfer initiated cross-linking may be effected as described for organic polymer sheets hereinbefore.

From the foregoing it will be seen in summary that the matrix may be formed inter alia by (a) adding the side chains (as defined) to a matrix of corresponding essentially organic cross-linked main chains without side chains, or (b) cross-linking a matrix of essentially organic or inorganic-organic polymer chains with side chains (as defined) linked to the polymer chains.

In case (b) the initial or product matrix favourably is one which does not readily crystallise at 0° to 100° C. Matrix formation by any of the foregoing methods will generally be effected during production of the Solid Electrolyte as described further hereinafter.

Suitable polar aprotic liquids dispersed in the matrix may be any compatible with the rest of the Solid Electrolyte, but include any such liquids with a dielectric constant of at least 20, preferably at least 50 and/or a dipole moment of at least 1.5, preferably at least 3 Debye. The liquid may be a pure liquid or mixture (mutual solution) of liquids or a solution of a solid solute other than the salt component c) as defined hereinbefore of the Solid Electrolyte. Within the above, suitable and preferred liquids are those which comprise or have a component comprising an $NO_2$, CN or (favourably) an $-A_1-E-A_2-$ group where $A_1$ and $A_2$ each independently are a bond, $-O-$, or $-NR-$ where R is $C_{1-4}$ alkyl and E is $-CO-$, $-SO-$, $-SO_2-$, or $-P(O)A_3-$ where $A_3$ independently is as defined for $A_1$ and $A_2$, or $-O-$ when $A_1$ and $A_2$ are each a bond. Such liquids or components thereof may also contain other substituents known to increase polarity, but without acidic hydrogen atoms such as secondary amino, esterified carboxyl and, such optionally substituted aminocarbonyl groups.

Within suitable and preferred polar aprotic liquids or components comprising an $-A_1-E-A_2-$ group are those of formula $R_1-A_1-E-A_2-R_2$ including $R_1-A_1-P(O)(A_3-R_3)-A_2-R_2$ where $R_1$, $R_2$ and $R_3$ are each independently hydrogen or optionally substituted hydrocarbyl or $R_1$ and $R_2$ together are optionally substituted hydrocarbadiyl (to from a cyclic $R_1-A_1-E-A_2-R_2$ compound), for example $C_{1-10}$ alkyl optionally non-terminally oxa-substituted, including $C_{1-4}$ alkyl, and $C_{2-6}$ alka-$\alpha,\omega$-diyl respectively.

Such liquids or components thereof thus include amides ($-CONR-$) such as dialkyl formamides for example dimethylformamide and N-methyl pyrrolidone, sulphoxides ($-SO-$) such as dimethylsulphoxide and thiophene-1-oxide, sulphones ($-SO_2-$) such as dimethylsulphone and sulpholane, carbonates ($-O-CO-O$) such as optionally oxa-substituted dialkyl and alkylene carbonates, for example diethyl, dipropyl, and bis(polyalkoxy alkyl) carbonates, including bis(methoxy ethoxyethyl) and bis(methoxy propoxypropyl) carbonates, and ethylene and propylene carbonates.

A group of such liquids include ethylene or propylene carbonate, a dialkyl formamide or -sulphoxide preferably where each alkyl group is $C_{1-4}$ alkyl, or a cyclic ether, for example tetrahydrofuran, or higher viscosity liquids such as sulpholane or higher molecular weight congeners of the foregoing, for example bis(-polyalkoxyalkyl) carbonates such as bis(methoxyethoxyethyl) carbonate.

Favoured liquids include cyclic amides such as N-methylpyrrolidone, and cyclic carbonates such as propylene carbonate.

The liquid may typically be present in the matrix as 5 to 250 parts by weight, favourably 35 to 200 parts by weight, per 100 parts by weight of the matrix.

Clearly the matrix should be in practical terms insoluble in the polar aprotic liquid, or, if soluble, the concentration of liquid in the matrix should be insufficient to dissolve the matrix to any appreciable extent. Of course where any salt is insoluble in the matrix the liquid concentration should be sufficient to dissolve the salt adequately. Suitable materials, and concentrations, within these constraints will be evident or a matter of routine trial.

The ions in the ionized ammonium, alkali metal or alkaline earth metal salt dissolved in the matrix and/or liquid may be (preferably) totally discrete and separated or may exist as ion pairs or higher aggregates (e.g. triple ions). The salt may suitably be a salt of $NH_4$, Na, K, Li or Mg, favourably Na, K, or Li, and preferably Li.

Suitable examples of the salt anion include mono- and divalent anions, inter alia $I^-$, $SCN^-$, $PF_6^-$, $AsF_6^-$, $BCl_4^-$, $BPh_4^-$, alkaryl sulphonate ions, and (preferably) $CF_3SO_3^-$, $ClO_4^-$ and $BF_4^-$. A preferred salt is lithium triflate $CF_3SO_3Li$. Mixtures of salts may be used.

The salt may typically be present in the matrix in a matrix:salt equivalent weight ratio of 1 equivalent part by weight of salt per 80 to 18,000 parts by weight of matrix, favourably 200 to 18,000, more favourably 200 to 7000 and preferably 400 to 7000 parts by weight. Where the matrix contains oxygen atoms in the side chains and/or the sheets, these ratios may be expressed in terms of equivalents of matrix oxygen atoms. The salt may be present as 1 equivalent per 4 to 100 equivalents matrix oxygen atoms, favourably per 10 to 40 equivalents.

The Solid Electrolyte may be made by a process comprising in any feasible order:
 (a) forming the matrix
 (b) incorporating the highly ionized salt in the matrix or a precursor thereof, and
 (c) introducing the aprotic liquid into the matrix or a precursor thereof.

In the case of an organic or organic-inorganic polymer matrix the steps are preferably carried out in the order (b), (a) and (c)

In such case, the salt is incorporated in a material (which may be a non-cross-linked polymer precursor of a cross-linked matrix, or an oligomer or monomer, or a mixture of such species) which is a precursor of a cross-linked polymer matrix. Matrix formation thus often involves cross-linking (e.g. as described hereinbefore) and optionally polymerization, either of which may be effected with or without a solvent or vehicle.

In brief, in such a case, in step (b) the salt or a solution thereof is dissolved in the matrix precursor or a solution thereof, the precursor is as necessary polymerized, typically to an average of 2,500 to 10,000 monomer units per main chain backbone, and often cross-linked, in step (a), as necessary with removal of solvents, to form a solid matrix, and in step (c) the aprotic liquid is introduced.

Step (c) may be effected for example by exposing the product to the vapour of the liquid, if necessary under vacuum and/or elevated temperature. For incorporating larger quantities of liquid it may be necessary to immerse the matrix in the liquid. To prevent leaching or osmosis of the salt from the matrix the liquid should contain more of the salt eg as a 1 or 2 M solution. To prevent incorporation of further salt in the matrix the chemical potentials of the salt in the matrix before dipping and in the solution should be roughly matched, unless of course it is desired to incorporate further salt in this way. However, for some salts in some matrices and liquids, higher concentration of the salt may unfavourably decrease the conductivity of the Solid Electrolyte, possibly by ion aggregate formation. The optimization of the conductivity is a matter of ready and routine trial as shown for example in the Table (E4.1) to (E4.4) hereinafter.

As stated hereinbefore one electrode of a device of the present invention surrounds the other, e.g. as a sheath separated from the other (core) electrode by the Solid Electrolyte. This feature provides a number of advantages additional to those provided by the generally used construction of high energy density devices. eg batteries with a high power density (ie power per unit weight), in which the electrodes and a solid electrolyte form a stack of roughly coterminous layers. Assemblies of this latter type must be sealed from the atmosphere and this is generally effected by sandwiching the stack between two slightly larger plastics sheets and sealing these together around the edges of the stack, generally with a hot-melt adhesive, and then encapsulating the whole in a barrier (plastics) film. The adhesive line is always a weak point in such a construction, and this is avoided in the present invention by the assembly consisting of a series of seam-free sheaths.

In a preferred embodiment all the components are cylindrical. An additional weak point in the prior art assemblies is the sharp curves at the edges of the final capsule which are always vulnerable to stress and abrasion. This is avoided by the preferred embodiment.

Additionally this latter construction can provide ease of assembly e.g. coating of a wire tow by conventional means, as compared with the more complex procedures require in the production of the prior art assemblies.

In the present device (eg cell), the Solid Electrolyte may be of any thickness between the electrodes provided it is cohesive and continuous, and it is clearly advantageous and preferred that it be as thin as possible. It may typically be from 1000 to $2\mu$ thick, for example 200 to $10\mu$ and 100 to $10\mu$, and is flexible even at the higher thicknesses and dimensionally stable and cohesive even at the lower thicknesses. As for the electrodes (described hereafter), at lower thicknesses it will have to be applied to a support, ie the anode and/or the cathode (either of which may in turn be supported as hereinafter described), and coating a precursor onto a support and forming the matrix in situ may be desirable.

It will be appreciated that a Solid Electrolyte with a thickness towards 10 micron is preferred, since it tends to increase the already good power density of cells, containing it. A sheath electrolyte of the foregoing dimensions in 'a sheathed wire' conformation of an electrochemical cell is a preferred aspect of the present invention, since the Solid Electrolyte has good cohesion and tensile and compression properties, which confer high flexibility on any resultant cell, so that it is comfortable to any desired shape.

The electrodes in a capacitor may be of any suitably inert and conductive material eg a metal or carbon black conventionally used in such devices. Conductive current collectors additional to and in contact with the electrodes will not generally be necessary.

The anode in a cell generally comprises a material capable of oxidative electron loss to form a cationic species. The cathode generally comprises a material correspondingly capable of receiving electrons to be reduced (ie a 'potential oxidant'). In one embodiment these electrode processes are reversible so that the cell is a secondary cell.

Thus for example the anode may suitably be or comprise an alkali metal such as Na, K or preferably Li. The metal may be comprised as an alloy component for example in a lithium aluminum alloy or less favourably as a dopant in a potentially salifiable ('conductive') polymer in particular one with an extended delocalised electron system, for example poly(p-phenylene) or polyacetylene. Often the anode material will be or comprise the same element as any alkali metal cation of the highly ionized salt in the Solid Electrolyte. In such cases the matrix should not contain any hydrogen atoms reactive to anode metal, for example such atoms $\alpha$ to carbonyloxy groups. The anode is conveniently a core (eg if metallic, a foil or preferably a single or multistrand wire) surrounded by the Solid Electrolyte and the cathode in turn, or in a thin sheath, (e.g., if metallic a foil) surrounding the Solid Electrolyte and cathode in turn. More preferably, it is a conductive core or a coating on such a core.

The anode may be of any thickness provided it is cohesive and continuous, and it is often desirable that it be as thin as possible (provided that the cell does not rely on conduction in the plane of the electrode). The anode may typically be from 5 to 2500 micron thick, for example 25 to 50 micron as a coating or foil, or 0.75 to 2.5mm in diameter as a wire. It will be appreciated that at lower thicknesses the anode will preferably be a coating on a support, for example a sheathing cell wall and/or the electrolyte or most preferably on a conductive core. It may even be necessary to apply the anode to the support, e.g., by vapour deposition. Such a support may be or comprise a conductive mesh, foil or preferably wire current collector, for example of a metal, such as nickel or aluminum, equipped with at least one terminal or terminal attachment. Aluminum is preferred, since the anode may then be a lithium aluminum alloy coating on and integral with the surface of the support. Such a support, if a core, may typically be from 0.75 to 2.5 mm thick, e.g., in diameter.

It will be appreciated that an anode or anode with support ('anode assembly') with as low as possible (total) thickness is preferred since it tends to increase the already good power density of cells containing it.

A wire anode (assembly) of the foregoing preferred dimensions in a 'sheathed wire' conformation of an electrochemical cell is a highly preferred aspect of the present invention.

The cathode may suitably comprise a higher oxidation state transition metal compound, i.e., one in which the transition metal is in a higher oxidation stage from which it may be reduced to a lower oxidation state i.e. a potential oxidant. Such compounds include transition metal chalcogenides, such as oxides, sulphides and selenides, eg $TiS_2$, $V_2O_5$, $V_6O_{13}$, $V_2S_5$, $NbSe_2$, $MoO_3$, $MoS_3$, $MnO_2$, $FeS_2$, $CuO$, $CuS$, transition metal complex chalcogenides such as phosphosulphides. e.g., $NiPS_3$, and oxyhalides eg $FeOCl_2$, and $CrOBr$, transition metal complex nitrides such as halonitrides, eg $TiNCl$, $ZrNCl$ and $HfNBr$ and other transition metal salts eg $Cu_3B_2O_6$, $Cu_4O(PO_4)_2$, $CuBi_2O_4$, $BiO(CrO_4)_2$ and $AgBi(CrO_4)_2$. The cathode may as one, less favourable, alternative comprise a potential oxidant in the form of either an anion (p−) doped conductive polymer where the anion may be the same as that of the highly ionized salt, for example $CF_3SO_3^-$ or $AsF_6^-$-doped poly-p-phenylene, or a neutral polymer with an extended delocalised electron system which on reduction gives a salifiable ("conductive") polymer which is doped by the incorporation by diffusion in use of cations from the highly ionized salt of the solid electrolyte, for example reduced poly-p-phenylene n-doped with $Li^+$ cations.

Favoured compounds include $TiS_2$, $V_6O_{13}$ and $MnO_2$, in particular $V_6O_{13}$ in which the cathodic redox process is potentially reversible.

In use internal current conduction between anode and cathode takes place via cation (eg $Li^+$) migration through the Solid Electrolyte.

Favourably, the cathode comprises a solid particulate dispersion of the potential oxidant and a highly conductive material in a matrix of a solid electrolyte, preferably (in a further aspect of the invention) the Solid Electrolyte.

Typical and preferred solid electrolytes within the cathode include those so described for the Solid Electrolyte hereinbefore.

Any material of a suitably high conductivity may be used in the dispersion, for example carbon black, acetylene black, or metals for example transition metals.

The proportions of the foregoing materials in the cathode will typically be in the ranges of 10 to 80% potential oxidant, preferably 30 to 60%; 1 to 30% dispersed conductive material, preferably 2 to 10%; and 10 to 80% solid electrolyte, preferably 30 to 60%.

All the above are weight percentages based on total cathode.

The disperse phase is generally present in particles of less than 40 micron grain size, eg less than 20 or less than 3 micron.

The cathode may be of any thickness provided it is cohesive and continuous, and it is clearly advantageous and preferred that it be as thin as possible provided that the cell does not rely on conduction in the plane of the cathode. The cathode may typically be from 3 to 1500 micron thick, for example 30 to 150 micron. It will be appreciated that at the lower thicknesses the cathode will have to be a coating on a support, for example preferably a sheathing cell wall and/or the electrolyte or on a conductive core, as described for the anode. It may even be necessary to form the cathode matrix in situ on such a support (matrix formation is described hereinbefore) having e.g., coated a precursor onto the support. As for the anode, such a support may be or comprise a conductive wire, or preferably mesh, foil or coating current collector, for example of a metal such as nickel, equipped with at least one terminal or terminal attachment, e.g., a nickel or nickel coated mesh or braid, or a nickel coating on a plastics film. Such a support, if a sheath, may typically be from 10 to 500 micron thick.

It will be appreciated that (as for the anode or anode assembly) a cathode or cathode with support ('cathode assembly') with (total) thickness as low as possible is preferred, since it tends to increase the already good power density of cells containing it.

A sheath cathode (assembly) of the foregoing preferred dimensions in a 'sheathed wire' conformation of an electrochemical cell is a highly preferred aspect of the present invention, since the cathode and the cell are flexible so that they are conformable to any desired shape.

In particular, a cathode which comprises the Solid Electrolyte has good cohesion and tensile properties, which confer high flexibility on any resultant cell or capacitor.

The cathode may be made in substantially the same general manner and preferred manner as the Solid Electrolyte but with the additional step (d):

(d) conventionally dispersing the potential oxidant and conductive material in the matrix or a precursor thereof.

In the case of a polymer matrix the steps are preferably carried out in the order (b), (d), (a) and (c).

The device assembly described above is desirably sealed into an insulative envelope, and preferably a moisture and air impervious one eg a barrier plastic. Where the assembly is in a preferred sheathed-wire embodiment, it may be further sheathed by a thermoplastic film, of for example a polyester such as polyethylene terephthalate, or a polyethersulphone, to enclose the assembly. This assembly may be further enclosed in a sheath of eg a barrier plastic such as Viclan (ICI). In both cases the sheath will extend to cover any axial ends, leaving necessary terminals protruding. A large surface area high capacitance embodiment of the capacitor or similar high-current embodiment of the cell is a capacitor or cell bank in parallel, in which the component capacitors or cells are a series of coaxial sheaths, with adjacent axial terminals connected in parallel. Alternatively or additionally, the axial terminals may be connected in series to give eg a higher-voltage series cell bank. In this arrangement only one insulator layer per capacitor/ cell is required, each capacitor/cell in the assembly being sandwiched by the radially inner and outer faces of adjacent sheaths of insulator. In a series cell bank, external terminals and connectors may be dispensed with by sheathing the anode or cathode of one cell with the cathode or anode respectively of the adjacent cell in mutual electrical contact and with or without support(s) or current collector(s) as apt. If desired the axial faces in the type of cell or capacitor bank construction may be covered (to seal the assembly) with a layer of similar insulator.

Accordingly, the present invention, in a further aspect, provides a series and/or parallel cell bank or parallel capacitor bank wherein the cells or capacitors are of the present invention and at least one cell or capacitor in the bank surrounds another.

The device provided by the present invention, whether, e.g., an electrochemical cell or an electrolytic capacitor, may be made up by conventional substrate production and coating techniques.

Accordingly, in a second aspect the present invention provides a process for preparing a device of the present invention, characterized by surrounding one electrode with the solid electrolyte or a precursor thereof, as necessary converting any such precursor to the solid electrolyte, and surrounding the solid electrolyte with the other electrode.

It is as noted before desirable that the product cell is further highly compact and flexible, especially as a preferred multi-sheathed cable embodiment.

Accordingly, in one embodiment of its second aspect the present invention provides a process for the preparation of such an embodiment of the device, characterized in that the Solid Electrolyte or precursor thereof is applied as a thin cylinder to a wire electrode or electrode assembly, and the other electrode is applied to the Solid Electrolyte also as a thin cylinder.

The wire electrode assembly itself may be an electrode coating which is applied to a supportive wire core in a first process step.

Suitable production methods include those for producing thin-film substrates and coatings, in particular in the form of (preferably coaxial) sheathing.

Where such a preferred device has an anode on a supportive wire core, an anode metal such as lithium may be coated onto a nickel or aluminum single or multi-strand wire (e.g., by evaporation or, in the case of a single strand wire, by extrusion about the wire).

Thereafter the Solid Electrolyte may be applied to the wire or coated wire.

This may conveniently be effected by wrapping several turns of a roll of a thin cast film of the Solid Electrolyte or a precursor thereof around the wire or by extruding the Solid Electrolyte or a precursor thereof about the wire, and then as necessary converting the precursor to the Solid Electrolyte.

Where a precursor is applied, this may be an un-crosslinked precursor of a cross-linked Solid Electrolyte, or it may be a precursor matrix without the polar liquid. The in situ process may be effected on the wire in essentially the same process steps as described hereinbefore for the general production of the Solid Electrolyte. In brief, in such a case, in first step (b) of the process (salt incorporation) the highly ionized salt or a solution thereof is dissolved in a non-crosslinked precursor of the matrix.

If the precursor is a matrix without polar liquid, it is then applied as a coating to the wire or coated wire, which may be effected with or without a further solvent or vehicle, and the precursor coat is optionally converted in situ to a crosslinked matrix by curing (optionally with solvent or vehicle removal). In subsequent step (c) the matrix is converted to the Solid Electrolyte by insertion of the highly polar liquid (and optionally further salt as described hereinbefore).

If the precursor is an un-crosslinked Solid Electrolyte, step (c) is carried out ex situ, and the precursor is then applied as above and cured in situ.

For a solid electrolyte device of the present invention which is an electrochemical cell, the composite cathode may be similarly applied, either preformed ex situ or, in particular for very thin cathodes, a high viscous precursor of the cathode (eg a high viscous liquid or gel dispersion of the cathode materials or precursors thereof such as a polymer precursor) may be applied and similarly converted to the cathode in situ.

Finally, any metal, e.g., nickel current collector may be applied, eg as a foil or mesh or as a (eg evaporated) coating on the cathode and/or on an insulator layer, followed by or together with the insulator layer.

The order of steps may of course be reversed if desired mutatis mutandis. Thus, the cathode may be applied onto a conductive supporting core as described for the anode or the Solid Electrolyte, depending on whether the cathode is metallic or the composite described hereinbefore. In the latter case it may be desirable to form the cathode matrix in situ on such a support (as described above for the Solid Electrolyte) by coating a precursor onto the support. As for the anode such a supporting core may be or comprise a conductive wire. The cathode or its precursor (as a gel coat) may be extruded about eg a nickel wire current collector. The Solid Electrolyte or its precursor is then applied to the cathode, and any precursor is converted into the Solid Electrolyte as described above. A supported metal anode eg lithium coated metal foil and an insulator sheath or an e.g., lithium coated metallized insulator sheath are finally applied.

In both cases, the insulator sheath may then be sealed around any terminals, and any further encapsulation carried out.

The cells of the present invention are capable of current densities of more than 0.5 A/m² eg of the order of 1 A/m² and above. Typical voltages are in the range of 2.5 to 4 V. Energy densities in excess of 150 Wh/kg may be produced.

Where:
(a) the Solid Electrolyte in such cells is based on a matrix of hydrocarbon polymer chains (eg polymethacrylate) optionally comprising oxygen atoms (eg polyethylene oxide) cross-linked by carboxy-polyethylene oxide-carbonyl cross-linking and side-chain groups or by alkylene cross-linking groups between chain atoms in the main chains, (b) the matrix is one which does not readily crystallize at 0° to 100° C., (c) the liquid in the matrix is/includes ethylene carbonate or a dialkylformamide, and (d) the layer of Solid Electrolyte between the cell electrodes is as thin as possible and is supported by and between them as hereinbefore described, even higher energy densities are attainable, especially with optimization of the anode and cathode materials, electrode thinness, and the electrolyte salt and its loading in the Solid Electrolyte as described hereinbefore.

The present invention is illustrated by the following Examples. The preparation and properties of the Solid Electrolyte and cathodes based thereon is illustrated in the following Descriptions.

DESCRIPTION 1

Preparation of an Ethylene Oxide (EO)/Methyl Digol Glycidyl Ether (MDGE)/Allyl Glycidyl Ether (AGE) Matrix Precursor (Uncrosslinked Terpolymer) (D1)

Methyl digol glycidyl ether is of formula $$CH_2\text{—}CH\text{—}CH_2OCH_2CH_2OCH_2CH_2OCH_3$$

A catalyst was made following the technique of E J Vandenberg, Journal of Polymer Science Part A-1 Vol 7 Pages 525–567 (1969) as follows. A 25% solution of Et₃Al (Et means ethyl) in heptane at 0° C. was diluted with dry diethyl ether to a concentration of 0.5 moles per liter, then kept at 0° C. and water (0.5 mole/mole Et₃Al) was added dropwise with stirring over 15 mins. Acetylacetone (0.5 mole/mole Et₃Al) was added dropwise with stirring at 0° C. Stirring at 0° C. was continued for 15 mins; this was followed by stirring overnight at room temperature all steps being done under an inert nitrogen atmosphere.

The following materials were charged to a stirred nitrogen purged 400 ml stainless steel autoclave: MDGE (19 ml), AGE (4 ml), and toluene (200 ml). Catalyst as above (18 ml) and ethylene oxide (10ml, as a liquid) were then added whilst continuing to stir throughout and the temperature raised to 110° C. for 2 hours. The hot viscous polymer solution produced was discharged into a 1 liter jar containing 5 ml methanol to inactivate the catalyst. The autoclave was given two hot washes with a total of 500 ml toluene. The washings were bulked with the polymer solution and thoroughly mixed.

The polymer solution was rotary evaporated to a volume of 300 ml and cast in a polyester tray in a fume cupboard and left overnight for the solvent to evaporate. The terpolymer was finally dried in a vacuum oven at 80° overnight to give 18.4 g of a sticky, rubbery product.

Molecular wt of the product was measured by gel permeation chromatography using lithium bromide in dimethylformamide as solvent.

MW = 380,000

100 MHz NMR was used to measure the relative amounts of the three monomers incorporated in the final terpolymer which were:

77.9 mole % EO 17.5 mole % MDGE 4.6 mole % AGE (i) Incorporation of S lt in Matrix Precursor (Uncrosslinked Polymer); Measurement of Conductivity of Uncrosslinked Film 1 g of terpolymer (D1) was dissolved in 25 ml dry acetonitrile with stirring under a nitrogen atmosphere. Lithium triflate ($CF_3SO_3Li$) was added to the solution to give a ratio of 16:1 oxygen atoms present in the polymer to lithium atoms.

The solution was cast into a glass/polytetra fluoroethylene mould and the solvent allowed to evaporate slowly under a stream of nitrogen. The 200 $\mu$m film was dried at 80° under vacuum for 4 hours to remove any traces of water or solvent and its ionic conductivity over a range of temperatures was measured by standard AC impedance techniques.

Conductivity 20° C. = $2 \times 10^{-5}$ mho.cm$^{-1}$ (ii) Incorporation of Salt in Matrix Precursor (Uncrosslinked Polymer); Forming the Matrix by Cross-linking the Precursor (a) 1 g of terpolymer (D1) was dissolved in 25 ml acetonitrile with stirring and lithium triflate was added to give a 16:1 oxygen to lithium ratio. 1.0 wt % dry benzoyl peroxide was added to the solution which was cast as above into a 200 $\mu$m film under a stream of nitrogen.

The film was lightly cross-linked by heating in a vacuum oven at 110° C. for 30 minutes.

Conductivity 20° C. = $3.5 \times 10^{-6}$ mho.cm$^{-1}$ (b) An acetonitrile solution of terpolymer (D1) (85% w/w). lithium triflate (13% w/w) and benzoyl peroxide (2% w/w), was cast into a film, and the film was cured, as in (a) above to give a 50 $\mu$m thick film.

(iii) Introducing the Liquid into the Matrix; adding Propylene Carbonate (PC)

Dry propylene carbonate was placed in the bottom of a dessicator and molecular sieve added to it. The dried cross-linked film from (ii)(a) above was placed in the vapour space above the liquid for an appropriate time at a total pressure of 1 to 2 mm of mercury at room temperature. In general about 25% of the propylene carbonate is taken up per hour based on the weight of the polymer and this rate is essentially constant for at least four hours. Solid Electrolytes (E1.1) to (E1.3) were produced in this way.

The procedure was repeated using the following liquids over a range of liquid coatings to produce the following Solid Electrolytes:

Sulpholane: (E1.4) and (E1.5)

Methyl digol carbonate: (E1.6) and (E1.7)

N-methylpyrrolidone: (E1.8) and (E1.9), all listed in the Table hereinafter.

The dried cross-linked film from (ii) (b) above was similarly treated with PC to a 50% weight increase to give Solid Electrolyte (E1.10).

All these Solid Electrolyte films were easy to handle and adequately dimensionally stable.

The films were kept dry before use in a cell.

DESCRIPTION 2

Preparation of a Methoxypolyethoxyethyl Methacrylate (MPM) Matrix Precursor (Monomer) (D2.1)

Methoxy PEG 350, Me($OCH_2CH_2$)$_{7.5}$—OH (145.8 g; dried over 4A molecular sieve), HPLC grade methylene chloride (80 ml) and dimethylaminopyridine (4.24 g) were added to a 500 ml flask with mechanical stirring. The flask was immersed in a cold water bath and methacrylic anhydride (65.0 g of 94% purity) added over 30 minutes from a dropping funnel. The reaction mixture was stirred for 17 hours at room temperature. The solution was transferred to a separating funnel and washed with 2 x 200 ml dilute HCl (40 ml conc. HCl in 360 ml water) followed by 2 x 200 ml 10% sodium bicarbonate solution followed by 2 x 200 ml water.

The solution was dried over $MgSO_4.1H_2O$ and filtered. Irganox 1010 antioxidant (0.5 g) was added and the solution rotary evaporated and then pumped for 2.5 hours on the vac line with stirring.

Finally, the MPM was distilled on a short path still under vacuum (5 x $10^{-3}$ mbar) at 230° C. Yield 115 g, stored in the freezer until required.

Preparation of an MPM/Allyl Methacrylate (AM) Matrix Precursor (Uncrosslinked Copolymer) (D2.2)

AM (ex Aldrich) was distilled under vacuum before use and passed down a column of 4A molecular sieve to remove the last traces of water. 1-Methoxy-1-methylsiloxy-2-methylprop-1-ene (MTS) (Aldrich) was distilled before use and stored in PTFE containers in the refrigerator. Tetrabutylammonium fluoride (TBAF) (Aldrich) supplied as a 1M THF solution was stood over $CaH_2$ for 2 days and filtered before use.

All operations were done under nitrogen in flame dried glass apparatus.

To a stirred solution of MTS (5.5 x $10^{-3}$ g) in dry THF (10.0 ml) was added (D2.1) (3.0 g), AM (0.11 ml) and TBAF (2 $\mu$l of 1M THF solution). The mixture warmed up and was stirred overnight at room temperature. 50 ppm Irganox 1010 antioxidant was added to the very viscous clear solution, which was cast into a polyester tray in a stream of nitrogen. The last traces of THF were removed by heating in a vacuum oven at 60° for 4 hours.

Molecular wt of the product was measured by gel permeation chromatography using lithium bromide in dimethylformamide as solvent

MW = 113,000

100 MHz NMR in $CDCl_3$ was recorded. There were virtually no free monomers in the copolymer and the ratio of MP 350 M units to AM units was 9:1.

(i) Incorporation of Salt in Matrix Precursor (Uncrosslinked Copolymer); Forming the Matrix by Crosslinking the Precursor Copolymer (D2.2) (1 g) was dissolved in 25 ml acetonitrile with stirring and lithium triflate was added to give a 16:1 oxygen to lithium ratio. 1.0 wt % dry benzoyl peroxide was added to the solution which was cast as in description 2 (ii) into a 200 $\mu$m film under a stream of nitrogen. The film was cross-linked by heating in a vacuum oven at 110° C. for 30 minutes.

Conductivity = $3.25 \times 10^{-6}$ mho cm$^{-1}$ (determined as in Example 7).

(ii) Introducing the Liquid into the Matrix; Addition of PC

As in Example 1(iii) with a similar rate of uptake to give Solid Electrolytes (E2.1) to (E2.3), all listed in the Table hereinafter.

DESCRIPTION 3

Preparation of an EO/MDGE Matrix Precursor (Uncrosslinked Copolymer without specific cross-linking functions) (D3)

As in Description 1, but omitting AGE and using 22 ml MDGE.

Yield 15 g; M Wt 431,000; Mole % MDGE 31.3.

(i) Incorporation of Salt in Matrix Precursor (Uncrosslinked Copolymer); Forming the Matrix by Cross-linking the Precursor Mixture Copolymer (D3) (1.062 g) and dry benzoyl peroxide (0.0244 g) were dissolved in 25 ml acetonitrile, with stirring and lithium triflate was added to give a 16:1 oxygen to lithium ratio. The solution was cast as in Example 2 into a 200 μm film under a stream of nitrogen. The film was cross-linked by heating in a vacuum oven at 110° C. for 4 hours. Cross-linked films produced in this way were very difficult to remove from the mould.

If the mould is immersed in liquid nitrogen, then the film usually separates cleanly. The films were re-dried by heating in a vacuum oven at 80° C. for 3 hours.

Conductivity of cross-linked copolymer film = 6 x $10^{-6}$ mho cm$^{-1}$ at 20° C. (determined as in Example 7).

(ii) Introducing the Liquid into the Matrix; Addition of PC

As in Description 1(iii) to give Solid Electrolytes (E3.1) to (E3.3) all listed in the Table hereinafter.

DESCRIPTION 4

Preparation of a Methacrylate End-capped Poly(ethylene Ether Carbonate) (Methacryloxy-poly (ethoxycarbonyloxyethoxy)ethyl Methacrylate) Matrix Precursor (Monomer) (D4)

Diethylene glycol (27.7 g) and dibutyl carbonate (44.5 g) were weighed into a test-tube fitted with a side arm and held under nitrogen. Sodium ethoxide solution (1 ml of 1.02 molar solution) was added by syringe. The reaction mixture was stirred magnetically. The tube was immersed in an oil bath at 150° C. The temperature was raised to 200° C. over 1 hour at atmospheric pressure. The pressure in the apparatus was gradually lowered to a few mm of Hg over 3 hours, to distil off butanol essentially completely.

After cooling, the very viscous product resin was dissolved in chloroform (100 ml) and washed in a separating funnel with dilute HCl (10 ml conc HCl/40 ml water) and then water (3 x 60 ml).

The solution was rotary evaporated and the resin dried under vacuum at 180° C. for 2 hours.

Molecular weight was determined by VPO in methyl benzoate at 136° C. and found to be 1810±10%.

Dimethylaminopyridine (0.1 g) was added to this product hydroxyl terminated oligomer (5 g) followed by methacrylic anhydride (2.17 g; Aldrich, 94% pure) in a reaction flask blanketed with nitrogen. The reaction mixture was stirred magnetically at 80° C. for 3 hours. The excess methacrylic anhydride was distilled out under vacuum at 80° C. The resin was dissolved in methylene chloride and transferred to a separating funnel and washed once with dilute HCl and then three times with water. The solution was dried with MgSO$_4$.1H$_2$O and filtered. 200 ppm 4-methoxyphenol antioxidant was added and the solution rotary evaporated until most of the methylene chloride had come off. The last of the methylene chloride was removed in a dry air stream over 4 hours.

(i) Incorporation of Salt in Matrix Precursor (Monomer); Forming the Matrix by Polymerizing and Cross-linking the Precursor Mixture A casting solution was prepared from resin (D4) (2.357 g), lithium triflate (0.3749 g), and dry benzoyl peroxide (0.046 g) in HPLC grade acetonitrile (20 ml) with stirring under nitrogen.

2 ml of this solution was placed in a glass mould coated with a mould release agent. The mould was placed in an oven with nitrogen blowing through it. The temperature was raised to 110° C. at 2° C./minute, held at 110° C. for 2 hours and slow cooled to room temperature overnight.

The clear rubbery film could be pulled easily from the mould.

Conductivity at 20° C. = 1.3 x $10^{-9}$ mho cm$^{-1}$ (determined as in Description 7).

(ii) Introducing the Liquid into the Matrix; Addition of PC

As in Description 1(iii) to give Solid Electrolyte (E4.1) listed in the Table hereinafter.

It proved difficult to incorporate any further propylene carbonate into the film by this method. An alternative method was to suspend the film in a dry solution of lithium triflate in propylene carbonate (1 molar). The film was dried by pressing between filter papers. This procedure was effected in a dry box over a range of liquid loadings, to give Solid Electrolytes (E4.2) to (E4.4) listed in the Table hereinafter.

DESCRIPTION 5

(i) One-pot Preparation of an MPM/Polyethylene Glycol Dimethacrylate (PDM) Matrix (Cross-linked Polymer) including Salt Polyethylene glycol 400 dimethacrylate (0.05 g; Polysciences), MPM (D2.1) (2.0 g) and dry benzoyl peroxide (0.02 g) were co-dissolved in 20 ml HPLC grade acetonitrile. Lithium triflate was added to the solution to give a ratio of 16:1 oxygen atoms present in the oligomers to lithium atoms.

2 ml of this solution was cast and cured as in Description 4, but at 80° C. for 24 hr.

(ii) Introducing the Liquid into the Matrix; Addition of PC

As in Description 1(iii) to give Solid Electrolytes (E5.1) to (E5.4), all listed in the Table hereinafter.

DESCRIPTION 6

Preparation of a Polysiloxane Matrix Precursor (Uncrosslinked Copolymer) (D6)

A silicon compound of formula (4 g) and a compound of formula (6 g) were dissolved in dry toluene (10 ml) and 1.0 ml of a solution of trans PtCl$_2$[(C$_2$H$_5$)$_2$S]$_2$ (1 mg dissolved in 1 ml of toluene) added, to give a fairly viscous solution.

The toluene was removed under vacuum to give a very viscous copolymer (i) Incorporation of Salt into Matrix Precursor (Uncross-linked Copolymer)

6.218 g of copolymer (D6) and 0.6223 g lithium triflate (0.6223 g) (O:Li ratio=20:1) were co-dissolved in 5 ml acetonitrile with stirring. 5 ml dioxane was added to reduce the evaporation of acetonitrile. The solution was cast onto the stainless steel electrodes of conductivity cells and solvent allowed to evaporate for 1 hour in air.

(ii) Forming the Matrix by Cross-linking the Precursor

Copolymer coated electrodes were cured in air and argon as described below.

Air

The electrodes were heated rapidly to 140° C. and held at 140° C. for 20 minutes in an oven and immediately removed from the oven.

Conductivity was $5.2 \times 10^{-6}$ mho cm$^{-1}$ (determined as in Example 7).

Film thickness was 170 μm.

Argon

Films were cast under argon and placed in an argon flushed oven. The oven was heated to 60° for 25 minutes and slowly allowed to cool to room temperature overnight.

(iii) Introducing the Liquid into the Matrix; Addition of PC

PC was incorporated into the 'air' films above, as in Description 1(iii), whilst still attached to the electrodes, to give Solid Electrolytes (E6.1) to (E6.3), all listed in the Table hereinafter. (The films are fairly difficult to remove from he electrodes, but will usually separate cleanly if immersed in liquid nitrogen as described hereinbefore).

DESCRIPTION 7

Measurement of Conductivity of the Solid Electrolyte

The ionic conductivity of the foregoing Solid Electrolyte films was measured by standard AC impedance techniques using a Solartron 1250 frequency response analyzer. The results are shown in the following Table, in which the '% liquid' is the weight % of liquid in the Solid Electrolyte, '% Increase' is the number of parts by weight liquid taken up by the penultimate film in the final process step taken as 100 parts, and conductivities are at 20° C. unless otherwise indicated in or by following brackets.

TABLE

| Solid Electrolyte | % Liquid | % Increase | Conductivity mho·cm$^{-1}$ × 10$^4$ |
|---|---|---|---|
| (E1.1) | 16.7 | 20 | 1.6 (25) |
| (E1.2) | 28.6 | 40 | 3.0 (25) |
| (E1.3) | 37.5 | 60 | 5.4 (25) |
| (E1.4) | 33.2 | 47 | 0.52 |
| (E1.5) | 49.3 | 96 | 0.96 |
| (E1.6) | 13.0 | 15 | 0.17 |
| (E1.7) | 44.4 | 80 | 0.39 |
| (E1.8) | 41.2 | 71 | 1.55 |
| (E1.9) | 60 | 150 | 4.8 |
| (E2.1) | 16.7 | 20 | 1.1 |
| (E2.2) | 28.6 | 40 | 2.15 |
| (E2.3) | 37.5 | 60 | 3.6 |
| (E3.1) | 15 | 18 | 1.3 |
| (E3.2) | 20 | 25 | 1.8 |
| (E3.3) | 33.3 | 50 | 3.6 |
| (E4.1) | 33.3 | 50 | 0.23 |
| (E4.2) |  | 80 | 1.2 |
| (E4.3) |  | 140 | 2.0 |
| (E4.4) |  | 180 | 0.48 |
| (E5.1) | 28.8 | 40 | 2.3 |
| (E5.2) | 33.3 | 50 | 3.2 |
| (E5.3) | 37.5 | 60 | 4.0 |
| (E5.4) | 41.2 | 70 | 5.2 |
| (E6.1) | 16.7 | 20 | 1.0 |
| (E6.2) | 28.6 | 40 | 2.3 |
| (E6.3) | 40.0 | 66 | 6.0 |

*% increase may include added salt
*Determined as in Description 6 (adherent to electrodes)

DESCRIPTION 8

Preparation of a Composite Cathode (C1) comprising the Solid Electrolyte

A solution as in Description 1(ii)(b) above, but containing in place of 85% w/w terpolymer (D1), 85% w/w of a mixture of which 50% w/w was terpolymer (D1), and the remaining 50% w/w was a dispersion of MnO$_2$ powder (45% w/w) and carbon black powder (5% w/w), was cast and cured as in Description 1(ii)(b) to give a 60μ thick film cathode. Propylene carbonate was introduced into the cathode precursor to give a cathode (C1)

DESCRIPTION 9

Preparation of a Composite Cathode (C2) comprising the Solid Electrolyte

A solution of terpolymer (D1) (2.25 g), lithium triflate (0.60 g) and benzoyl peroxide (0.5 g) in acetonitrile (25 g), containing a dispersion of 'conducting' MnO$_2$ powder (2.00 g) and carbon black powder (0.60 g) was cast into a film and cross-linked as in Description 8 above. The film was dried for 3 hr at 89° C. in vacuo.

DESCRIPTION 10

Preparation of a Solid Electrolyte (E7) A solution of terpolymer (D1) (1.00 g), lithium triflate (0.22 g) and benxoyl peroxide (0.02 g) in acetonitrile (25 g) (g) was cast into a film (but no cross-linked o dried) as in Description g above.

EXAMPLE 1

A Cell Assembly Comprising the Solid Electrolyte

The assembly of electrochemical cells in accordance with the present invention is described below with reference to the accompanying drawings (not to scale).

Cell assembly (CA1)

This assembly is depicted in FIGS. 1 to 3 in which.

Figure 1:
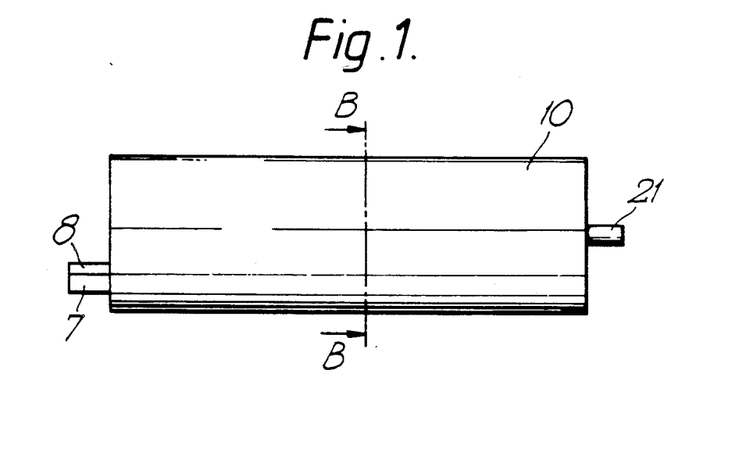
FIG. 1 is a side elevation of the cell assembly.
Figure 2:
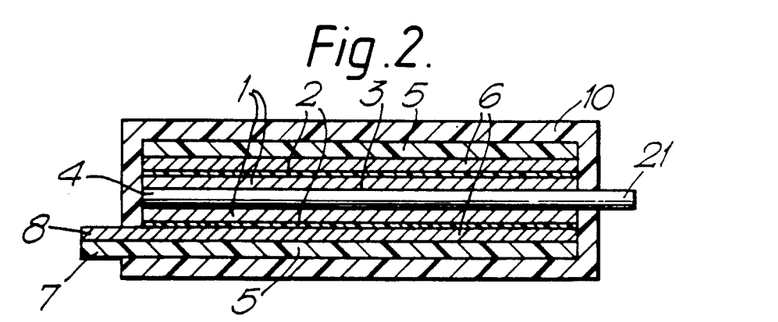
FIG. 2 is a longitudinal section of the assembly viewed along AA in FIG. 3.
Figure 3:
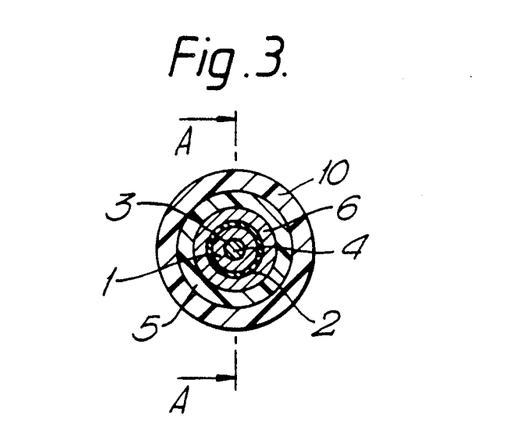
FIG. 3 is a cross section of the cell assembly viewed along BB in FIG. 1.

The elongate cell (CA1) consists of a 500 μm aluminum single strand wire core 4, bearing a 50 μm thick coating of lithium and/or lithium aluminum alloy anode 3 and sheathed by an elongate coaxial casing 1 of Solid Electrolyte (E1.10). This sheathed wire is in turn sheathed by a layer 2 of cathode film (C1).

The cell is peripherally coated by film 5 of polyester (Melinex; ICI; 120 μm thick) itself coated on the inner face with a nickel current collector coat 6 (100 μm thick) At one end of the cell, an arcuate portion of the tubular film extends to form a lug 7 with a metal face 8. At the other end of the cell an end 21 of the wire core 4 uncoated with anode 3 similarly extends axially beyond the rest of the cell.

The coated cell is encapsulated in a layer 10 of an air and water impervious barrier polymer (Viclan, ICI) leaving wire end 21 and lug 7 projecting through the layer 10, to be used for external connections to the cell (optionally fitted with the appropriate terminals.

The components are so dimensioned and/or so applied that all the plastics or plastics-containing components are resiliently biased against the adjacent components.

The cell assembly (fully encapsulated) is less than 3 mm in overall diameter and may be as long as is compatible with acceptable internal resistances.

A cell assembly of this type and dimensions using the component materials described hereinbefore has an open circuit voltage of 3 to 4 volts and good steady working current (the maximum value of which depends on the length of the cell). Analogues of such a cell may be produced using eg different dimensions to optimize the voltage, maximum current and/or power density as desired; such optimization is largely a matter of routine trial. Analogues and derivatives of such a cell may be produced varying the component materials of the cell eg using any other suitably conductive materials within the scope of the present invention which are inert in any undesirable side reactions, such as varying any metal in the electrodes, and/or their supports and/or current collectors or any material in the Solid Electrolyte or any cathode comprising it. Such variations may be used to optimize the electrical and/or mechanical properties of the cell.

Cell Assembly (CA2)

This assembly is depicted in FIGS. 4 to 6 in which.

Figure 4:
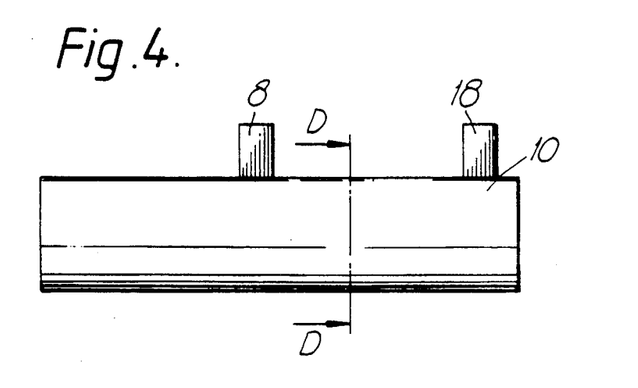
FIG. 4 is a side elevation of the cell assembly.
Figure 5:
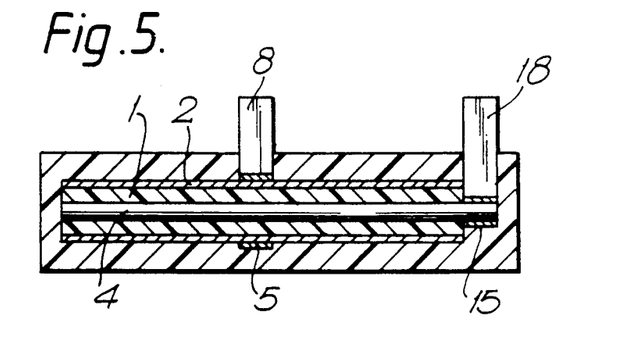
FIG. 5 is a longitudinal section of the assembly viewed along CC in FIG. 6.
Figure 6:
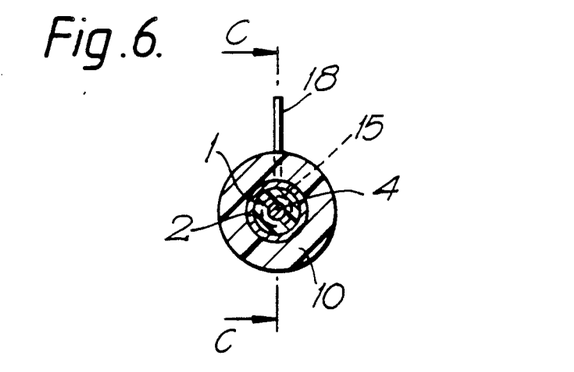
FIG. 6 is a cross section of the cell assembly viewed along DD in FIG. 4.

The elongate cell (CA2) consists of a lithium wire 4 c. 3.2 mm in diameter and c. 80 mm long, with a roll of 1 of the Solid Electrolyte film (E7), 70 mm long and <2 mm in overall diameter wrapped around it to leave a 10 mm length 21 of the wire 4 projecting from each end of the roll. The wrapped wire (4+1) is in turn wrapped with roll 2 of the cathode (C2) axially coterminous with the roll 1 of Solid Electrolyte.

The cathode 2 is wrapped with a loop of 5 of a nickel foil current collector with radially projecting lug 8, and the wire anode 4 has a similar loop 15 about it with lug 18. The whole is encapsulated in a layer 10 of a barrier epoxy resin (Araldite) (c. 0.5 mm thick), leaving only the lugs 8 and 18 projecting. The cell assembly is c. 3 mm in overall diameter.

In preparing (CA2), the lithium wire 4 was cleaned in diethyl ether to remove storage oil, and abraded overall with emery paper to improve electrolyte cohesion. The cast film (E7) (Description 10) was half removed from its casting ring, trimmed to have two parallel edges no more than 70 mm apart, and rolled onto the wire 4 such that the parallel edges were transverse to the wire 4. The cast film of composite cathode (C2) (Description 9) was similarly treated and rolled around the wrapped wire (4+1). A strip 5 of nickel foil was looped firmly about the cathode 2 and joined to itself to form a radially projecting lug 8. A similar strip 15 was used to form a lugged loop about the wire 4. A layer 10 of Araldite was cast around the assembly to leave only the lugs 8 and 18 projecting.

The assembly (CA2) has a working area of 24 mm$^2$ and an open circuit voltage of 3.43V. It performs well as regards the voltage drop caused by polarision under high current drain.

DESCRIPTION 11

Preparation of a Composite Cathode (C3) comprising the Solid Electrolyte

A solution and dispersion as in Description 8 hereinbefore using a polyphenylene powder in place of $MnO_2$ powder was similarly processed to give a film cathode (C3).

The polyphenylene used was supplied by ICI and/or is preparable by the methods described in EP-A 76,605 and EP-A 107,895.

EXAMPLE 2

Cell assemblies are produced analogously to (CA1) and (CA2) in Example 1, but using the cathode (C3) in place of cathode (C1) and (C2) respectively.

This assembly is pre-charged before use as a cell at a constant current of 50 μA to p-dope the polyphenylene as:

DESCRIPTION 13

Preparation of further Composite Cathodes comprising the Solid Electrolyte

Precursors of all the Solid Electrolytes of the Table may be used with the potential oxidants of Descriptions 8, 9 and 11 and processed analogously to form corresponding composite cathodes.

EXAMPLE 3

Further Cell Assemblies comprising the Solid Electrolyte

All the Solid Electrolytes in the Table may be used (optionally with a corresponding composite cathode substantially as in Description 13) to form cell assemblies analogously to those of Example 1.

What is claimed is:

1. An electrochemical or an electrolytic device which comprises a conductive anode and cathode separated by a solid electrolyte, and wherein one electrode surrounds the other so that said device is in the form of a flexible multi-sheathed cable, and the solid electrolyte comprises:
    (a) a matrix of polymer main chains, having sidechains linked to the main chains, which side chains comprise polar groups free from active hydrogen atoms, said matrix polymer main chains being cross-linked and essentially organic, and the sidechains comprising ester or ether linkages,
    (b) a polar aprotic liquid dispersed in the matrix, and
    (c) an ionized ammonium, alkali metal or alkaline earth metal salt dissolved in the matrix and/or liquid.
2. A device according to claim 1 which is an electrochemical cell comprising electrodes capable of mutual electrochemical reaction.

3. A device according to claim 1, characterized in that the main chains are hydrocarbons or polyethers cross-linked by C—C bonds or oxy functions between the main and/or side chains, or in other pendent groups.

4. A device according to claim 3, characterized in that 2 to 8% of the monomer units of the main chains are cross-linked via the side-chains or other pendent groups, and the main chains average 2,500 to 10,000 backbone monomer units per chain.

5. A device according to claim 1, characterized in that the aprotic polar liquid is ethylene or propylene carbonate, a dialkylforamide or -sulphoxide, a cyclic ether, sulpholane or a bis(polyalkoxyalkyl) carbonate, or a cyclic amide present in the matrix at 35 to 200 parts by weight per 100 parts by weight of the matrix.

6. A cell according to claim 2, characterized in that it comprises a cathode which comprises a solid dispersion of 30 to 60% $MnO_2$ and 2 to 10% carbon black, acetylene black or a transition metal (w/w on total cathode) as particles of less than $40\mu$ grain size in a matrix of said solid electrolyte.

7. A process for preparing a device according to claim 1, characterized by surrounding one electrode with the solid electrolyte or a precursor thereof, as necessary converting any such precursor to the solid electrolyte, and surrounding the solid electrolyte with the other electrode.

8. A process according to claim 7 characterized in that the solid electrolyte or precursor thereof is applied as a thin cylindrical film to a circular cross-section wire electrode or electrode assembly, and the other electrode is applied to the solid electrolyte also as thin film.

* * * * *